Jan. 13, 1970

S. W. MALINSKI 3,489,198

METHOD AND APPARATUS FOR MOUNTING
AND REMOVING PNEUMATIC TIRES

Filed Jan. 25, 1967

INVENTOR
SYLVESTER WILLIAM MALINSKI
BY
*Jerome A. Gross*
ATTORNEY

Jan. 13, 1970    S. W. MALINSKI    3,489,198
METHOD AND APPARATUS FOR MOUNTING
AND REMOVING PNEUMATIC TIRES
Filed Jan. 25, 1967    3 Sheets-Sheet 2
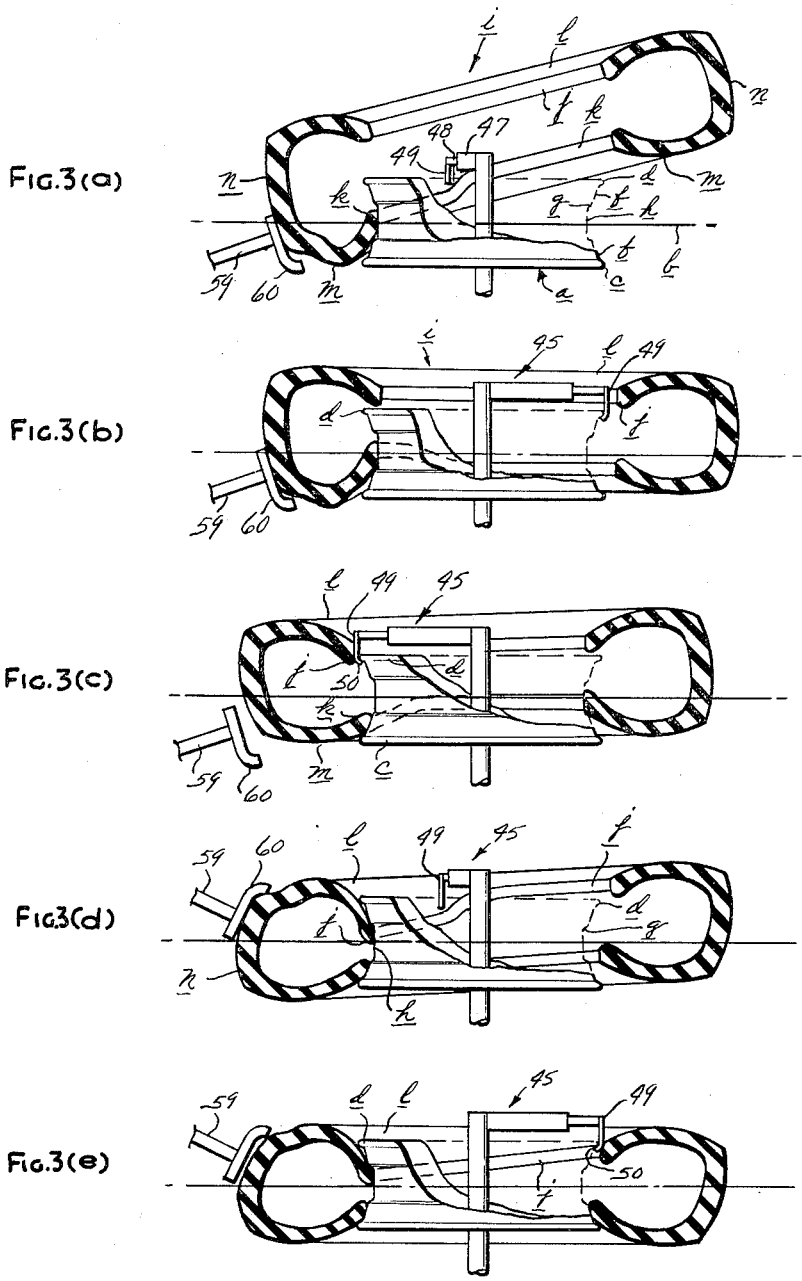
INVENTOR
SYLVESTER WILLIAM MALINSKI
BY
Jerome A. Gross
ATTORNEY Jan. 13, 1970 S. W. MALINSKI 3,489,198
METHOD AND APPARATUS FOR MOUNTING
AND REMOVING PNEUMATIC TIRES
Filed Jan. 25, 1967 3 Sheets-Sheet 3

INVENTOR
SYLVESTER WILLAM MALINSKI
BY Jerome A. Gross
ATTORNEY

United States Patent Office 3,489,198
Patented Jan. 13, 1970

3,489,198
METHOD AND APPARATUS FOR MOUNTING AND REMOVING PNEUMATIC TIRES
Sylvester William Malinski, P.O. Box 161,
Tamaroa, Ill. 62888
Filed Jan. 25, 1967, Ser. No. 611,682
Int. Cl. B60c 25/06
U.S. Cl. 157—1.17                                    13 Claims

ABSTRACT OF THE DISCLOSURE

Method and apparatus for mounting large size pneumatic tires onto dual-flanged rims, and for removing them, manipulates the two sidewalls separately in successive operations. A radially inward force buckles one sidewall as its bead bears against the cylindrical surface of the rim. This shifts the remainder of that sidewall, so that, opposite to the point of force application, the bead is clear of the rim flange, and intermediate portions are stretched, for easy deflectance over the flange.

A horizontal mount secures the lower flange of the rim. On a stand radially outward of the rim, a power cylinder is mounted by a horizontal pivot, to exert its force slantingly downward at the upper sidewall or slantingly upward at the lower sidewall. For mounting tires, a pair of rim following bead deflector guide arms, mounted on powered shafts near the center of the rim, are turned simultaneously in opposite directions, deflecting the stretched bead onto the rim. For tire removal, a jack directed perpendicularly upward against the tire on the side opposite to the power cylinder, forces the separately shifted sidewalls off over the rim flange.

BACKGROUND OF THE INVENTION

The present invention relates to method and apparatus for use in mounting large size pneumatic tires onto dual-flanged rims, and in removing them.

Dual-flanged drop-center rims, such as commonly used for the pneumatic tires of passenger automobiles, but not been practical for the immense tires (sometimes called "off-the-highway" tires) utilized, for example, on large earth-moving equipment. To mount or remove a tire over the flange of a rim requires drawing the beads out of round, for the bead perimeter is necessarily shorter than the flange perimeter. With the relatively small pneumatic tires used for passenger cars, the force required to deflect a tire bead out of round and, holding it so, to manipulate it over the flange, may safely be applied locally by prying tools, such as tire irons. For much larger sizes of tires, this becomes impossible; the tire beads are reinforced with heavy wire, and rubber and cord materials could not withstand proportionally larger forces if applied locally, as with prying tools.

At present, the practice is to mount such large tires upon rims which have one removable flange, using a drive lug, a locking ring and a gasket ring. To attach and remove such a flange with its attendant parts is slow and painstaking; and safety precautions are necessary to avoid severe injuries to personnel from the explosive energy of inflated tires.

Both hand tools and hydraulic tools have been used to free the tire bead from the flanges of such rims. Tools and procedures are shown in "Off the Highway Tires Maintenance Manual," published by The Rubber Manufacturers' Association; and a machine for removing tires from rims of this type is shown in U.S. Patent No. 3,231,001.

For handling the smaller tires, whose flexible construction does not involve the same problems, tools principally for mounting are shown in various patents, including Nos. 3,029,861 and 3,037,549; while tools principally for removing tires are shown in Nos. 3,086,578; 3,003,544; 2,903,050; 2,628,669, and 2,281,476.

SUMMARY OF THE INVENTION

The purposes of the present invention are to provide a new procedure and apparatus which makes it feasible to use dual-flange drop-center rims for such large size pneumatic tires; which avoids imposing excessive prying forces on localized portions of the tire beads; which safely forces the tire out of round against distributed resistance, rather than be locally excessive prying forces; and which manipulates the beads gently over the rim flange. Further purposes are to provide apparatus by which one man can easily mount and remove such massive tires, using dual-flanged drop-center rims. Other purposes will be apparent from this disclosure.

Summarizing generally, the method consists of applying against the tread of the tire, at its sidewall whose bead is inserted between the flanges, a force having a radially inward component, driving a portion of the bead into the drop-center portion of the rim where the inward force is resisted by distributed pressure of its convex surface. This buckles the sidewall portion between the points of force application and resistance, and shifts the major part of that sidewall to beyond center of the rim. Elastic resistance to such shifting, exerted by the bead as it bears against the smaller-diameter drop-center portion, draws the bead out of round without any local concentration of force. Holding the sidewall in such shifted position, the bead is gently deflected over the rim flange. This procedure is applied successively to both sidewalls. Since no large locally concentrated prying or stretching force is applied, there is no danger of a local break.

The new apparatus incorporates a preferably horizontal mount for securing the lower flange of the rim, and a power cylinder mounted, on a stand radially outward of the rim, by a horizontal pivot. The pivot is at the level of the middle plane of the rim, so that the force of the power cylinder, which may be exerted either slantingly downward or slantingly upward, drives the bead into the drop-center. In mounting a tire there is also employed a pair of rim-following bead deflector guide arms, mounted on shafts near the center of the rim; a powered rack turns these shafts simultaneously in opposite directions to deflect the bead over the rim flange while the power cylinder holds the sidewall in shifted, out-of-round position. To remove the tire, a jack is provided to exert a force upwardly perpendicularly against the tire on the side to which it has so shifted, driving the out-of-round bead over the flange.

BRIEF DESCRIPTION OF THE DRAWINGS

FIGS. 3a, b, c, d and e illustrate successive steps of the process of mounting a tire.

DESCRIPTION OF THE PREFERRED EMBODIMENTS

Figure 1:
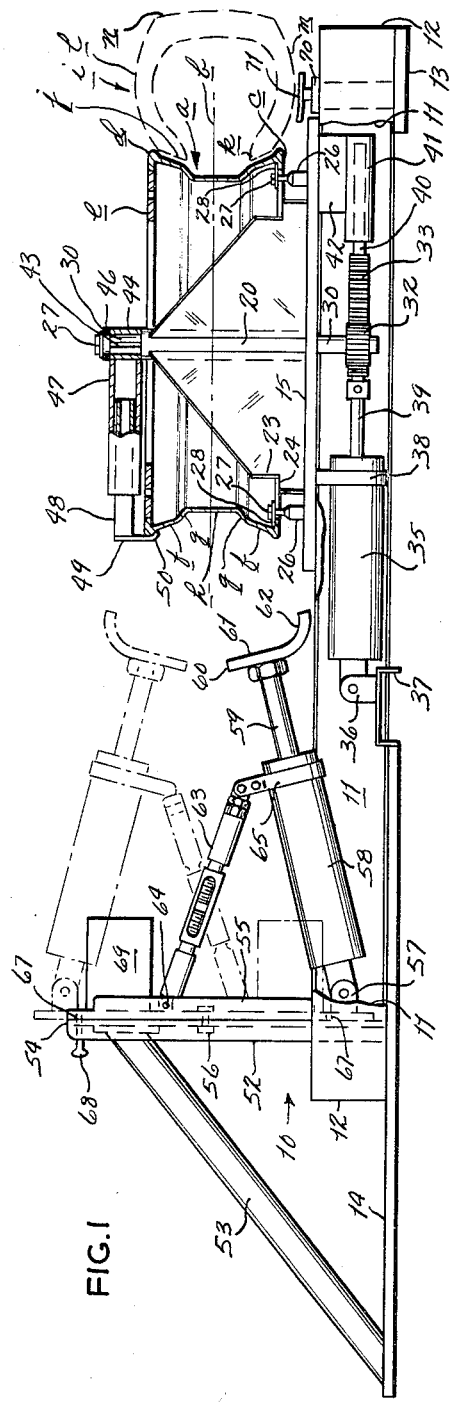
FIG. 1 is a side elevation, partly fragmentary, of a preferred form of apparatus for mounting and removing a tire, shown in dashed lines, from a rim shown in section.

The apparatus shown in FIG. 1 includes a rectangular rigid horizontal frame generally designated 10, which may be fabricated by welding two elongated channel frame side elements 11 to two shorter end elements 12. At the right end of FIG. 1 is secured a narrow bottom plate 13 beneath the end member 12 of the frame 10; whereas at the left end is a large bottom plate 14 of equal thickness, extending a substantial distance to both sides of the left end frame element 12.

Figure 2:
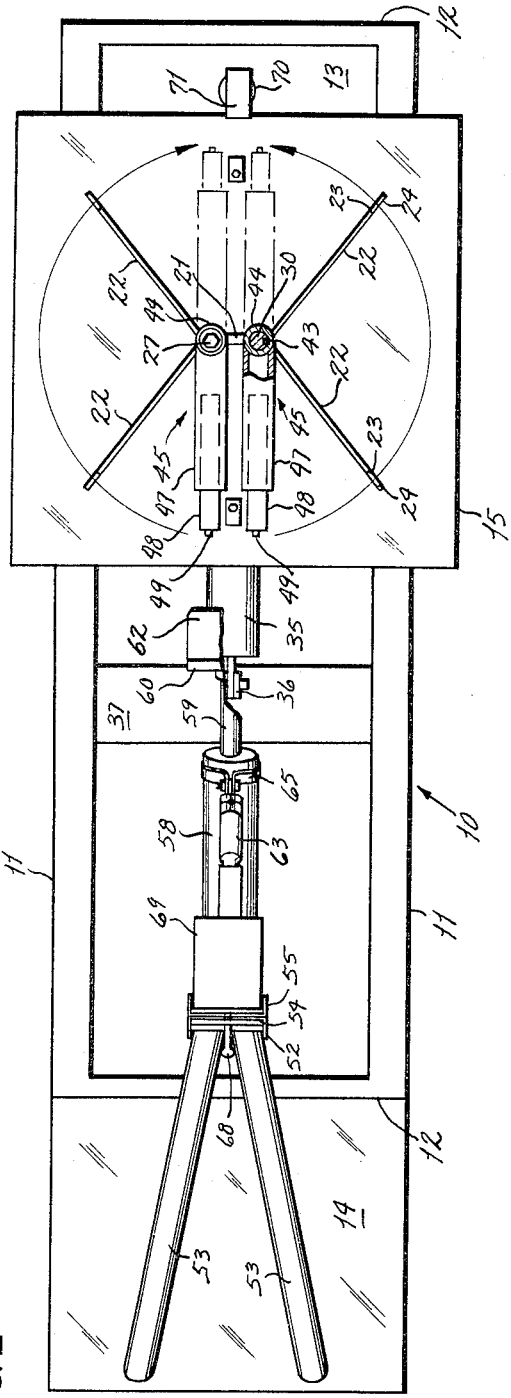
FIG. 2 is a plan view, partly fragmentary and partly schematic, of the apparatus of FIG. 1.

Secured to the upper flanges of the elongated channel frame side elements 11, near the right end of the frame shown in FIG. 1, is a horizontal platform plate 15, which as shown in FIG. 2 is substantially square, its width being somewhat greater than that of the frame 10. Approximately at the center of the platform 15, and spaced close to each other forward and aft of center, are two vertical tubes 20 which establish vertical axes for the bead deflector guide means to be described. The tubes 20 are welded at their bases to the platform 15 and held in vertical alignment with each other by a connecting support web 21. Each tube 20 also has a pair of sloping, right triangular support plates 22, which are welded to the platform 15 in spread-apart V-like pairs. Their vertical edges are welded to the outer sides of two fixed vertical tubes 20. Their diagonal edges, which slope downwardly from near the upper ends of the two fixed vertical tubes 20 to the platform 15, are cut away at a level spaced somewhat above that of the platform 15 to provide rim support notches 23, each having a horizontal rim support portion 24 at the same level.

Midway between the two left-extending support plates 22, and similarly between the two right-extending support plates 22 (as shown in the plan view FIG. 2) short vertical latching posts 26 are welded to the platform 15. Their upper ends are tapped to receive machine bolts 27 which penetrate latching hold-down plates 28. These are used to secure a rim designated $a$, shown in section in FIG. 1, on the rim support portions 24 of the notches 23. The middle plane of the rim $a$ is thus supported at the level designated $b$ in FIG. 1. The rim $a$ is of the dual-flanged drop-center type; the latching hold-down plates 28 engage its under flange $c$ leaving its upper flange $d$ free. The upper flange $d$ may have a permanently-secured wheel element such as the annular welded plate element $e$, which has bores for bolting to a wheel hub, not shown, secured to the axle of the heavy automotive equipment on which the rim $a$ is used.

The vertical tubes 20 are spaced close to the center of the platform 15, being only far enough apart to permit utilizing the rack and gear mechanism hereinafter described. The tubes 20 establish vertical axes for a pair of parallel rotatable shafts 30, which extend through the tubes 20 and project from both the upper and lower ends. On the lower projecting ends, beneath the platform 15, are fixedly secured pinion gears 32, separated from each other and powered by a horizontally reciprocating rack 33. On reciprocating movement the rack 33 turns the gears 32 and their shafts 30 simultaneously in opposite directions through semi-circular arcs (see FIG. 2). Reciprocating movement is imparted to the rack 33 by a longitudinally-aligned double-acting hydraulic cylinder which serves as a linear actuator 35. It is supported at its left outer end in a clevis bracket 36 welded to a frame cross-brace 37, its other end being suspended from the platform 15 by a U-bracket 38. The actuator's piston rod 39 drives the rack 33 back and forth, from left to right, when controls, not shown, direct to it hydraulic fluid under pressure. The opposite end of the rack is supported by a rigidly connected rod extension 40, which slides within a horizontal guide tube 41 supported concentric with the actuator cylinder 35, as by a plate 42 welded beneath the platform 15.

The upper ends of the shafts 30, projecting above their supporting tubes 20, have longitudinal keyways and keys 43, for mounting and engaging corresponding keyways in the tubular ends 44 of de-mountable telescoping guide arms generally designated 45. The level at which the guide arms 45 are mountable is adjusted by a thick spacer washer 46, which in FIG. 1 is shown on top of the tubular guide arm ends 44; but if the rim $a$ is of greater width, the spacer washers 46 are insertable between the upper ends of the two fixed vertical tubes 20, and the tubular guide arm ends 44. Bolts 27 secure the arms 45 to the shafts 30.

The bead deflector guide arms 45 include, in the embodiment shown, an outer square tube 47 welded perpendicular to tubular end 44 to extend horizontally therefrom, and an inner telescoping square tube 48. To its outer end is welded a bead deflector guide shoe 49, whose outwardly presented guide surface extends vertically downward to a level below the bead deflector guide arms 45 and terminates in a radially-inward curving toe portion 50. With the guide arms 45 positioned at a level above the rim's upper flange $d$, the guide shoes' toe portions 50 will extend below that level, to follow around the upper rim flange $d$ in semi-circular arcuate paths. The small displacement from center of the axes of the shafts 30 is accommodated by the inner telescoping square tubes 48 moving telescopingly within the outer square tubes 47.

At the left side of the frame 10, welded vertically onto the bottom plate 14, is an upright channel 52. Its upper end is supported from the left side by a pair of diagonally slanting welded support tubes 53. The flanges of the channel 52 are directed to the left side of FIG. 1; its web surface 54 of the channel 52, presented vertically and facing in the direction of the platform 15, is unimpeded fore-and-aft. Against this surface 54 is mounted the similar flat surface of the web of a swiveling channel 55, the mounting means being a strong horizontal swivel pin 56 at a level which is at near the middle plane $b$ of the rim $a$. The swivel pin 56 carries the entire weight of a turret-like assembly which consists, in addition to the swiveling channel 55, of the elements now to be described.

On the side of the swiveling channel 55 which faces away from the web 54 of the fixed channel 52, at a point remote from the pin 56, is a clevis bracket 57, which mounts the fixed end of a hydraulic pressure-applying cylinder 58. This extends slantingly away from the channel 55; from its other end projects its piston rod 59, to which is mounted a force-applying shoe 60. The shoe has a flat sole portion 61 perpendicular to the piston rod 59 and ends in a toe portion 62 curving away from the rod 59, as shown in FIG. 1. This shape adapts the shoe 60 to press its sole portion 61 against the tread $n$ of a tire $i$, with the toe portion 62 outward of the tire sidewalls $l$. The position of the pressure-applying cylinder 58, which directs its force slantingly toward the middle plane $b$, is maintained and adjusted by a turn buckle link 63 mounted at its one end by a mounting pin 64 through the flanges of the channel 55, and at its other end by a rigid strap 65 around that end of the cylinder 58 which is remote from the channel 55.

The assembly so mounted on the swivel pin 56 may be set in two positions: one with the pressure-applying cylinder 58 in the lower position and directed slantingly upward toward the middle plane $b$ of the rim, as shown in solid lines in FIG. 1; and the other with it directed slantingly downward toward the middle plane $b$, as shown in dashed lines in FIG. 1. Upper and lower securing bores 67 through the web of the channel 55, equally spaced from the swivel pin 56, are alternately positionable in alignment with a latching pin 68 which acts through the web 54 at an equal spacing above the swivel pin 56. A counterweight 69 affixed between the flanges of the channel 55 on the side of the mounting pin 64 opposite to the swivel pin 56, makes the turret-like assembly readily reversible.

On the opposite side of center of the platform 15, outwardly of the short vertical latching posts 26, a hydraulic telescoping jack 70 is welded in place on the narrow bottom plate 13. The jack 70 has a jacking axis perpendicular to the middle plane $b$ of the rim $a$. The upper end of the telescoping jack shaft is fitted with curved plate 71 which has a lowered position below the lower sidewall of a tire $i$ when its rim $a$ is resting on the notch support portions 24. The plate 71 may be raised by the telescoping operation of the jack 70 to a level above the middle plane $b$ of the rim $a$, for removing tires in the manner hereinafter described.

METHOD OF MOUNTING

Tires are mounted by the method illustrated in FIG. 3, on large size dual-flanged rims such as the rim $a$ of FIGS. 1 and 3 whose configuration is somewhat similar to that of the drop-center rims conventionally used for tires of passenger automobiles.

Inwardly of their radially outer rounded edges, the under and upper rim flanges $c$, $d$ have bead-seating portions $f$ which are not cylindrical but taper slopingly inward at an angle of approximately 15° toward the middle plane $b$. They end in more steeply sloping sides $g$ of a drop-center rim portion $h$, which extends to both sides of the rim middle plane $b$. From the bead-seating portions $f$ inward to the drop-center rim portion $h$, all these surfaces are outer surfaces of revolution about the axis of the rim $a$, and thus are "convex" as that term is used in the claims.

The cord body of a typical earth-mover tire, generally designated $i$ terminates inwardly in wire-reinforced upper and lower beads $j$, $k$ which are sloped to fit against the bead-seating portion $f$ of the rim $a$. From the beads $j$, $k$, upper and lower rubber covered sidewalls $l$, $m$ extend to a heavy, radially outer tread $n$. To mount or remove a tire from a dual-flanged rim such as the rim $a$, the reinforced beads $j$, $k$ must be drawn and held out-of-round and then progressively deflected over the rim flange $d$.

In the present invention, advantage is taken of the fact that the upper sidewall $l$ possesses a resilient elastic tendency to retain its shape as an annulus at one level, however it may there be distorted; that the lower sidewall $m$ possesses a similar tendency; and that these normally concentric annuli may be separately distorted and shifted in their separate levels out of concentricity for limited distances.

Figure 5:
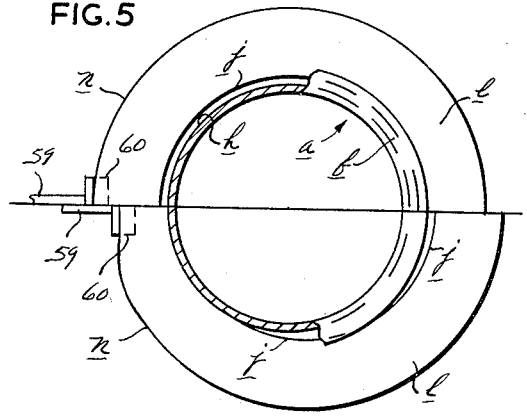
FIG. 5 is a schematic plan view of a tire mounted on a drop-center rim, the lower half showing how radially inward applied local force shifts the major part of the tire sidewall to the other side of rim center.

Such shifting of the upper sidewall $l$ out of concentricity with the rim $a$ is shown schematically in the lower half of plan view FIG. 5, in contrast to the upper half of said figure which shows the tire in undisturbed position. When the bead $j$ is in its undeflected round position, as shown in said upper half, its inner perimeter has a diameter which fits onto the bead-seating portion $f$ of the rim. This diameter is substantially greater than that of the drop-center rim portion $h$. When a local force is applied against the tread $n$ by the force applying shoe 60, the component directed radially inward toward the center of the rim $a$ buckles the portion of the sidewall $l$ against the distributed resistance of the convex drop-center rim portion $h$. The force on the tread $n$ shifts the major part of the sidewall $l$ to the right, exerting tension and the bead $j$ and drawing it tightly against and to the contour of the smaller-diameter convex surface of the drop-center rim portion $h$, and holding it out-of-round. In this position the extreme right side of the bead $j$ is displaced sufficiently to the clear of the rim upper flange $d$; and after the bead $j$ is drawn tightly against the smaller-diameter drop-center portion $h$, enough of its perimetral length remains to permit easy deflectance around the rim upper flange $d$.

In FIG. 3a, the rim $a$ is shown secured horizontally, while the tire $i$ is positioned with its lower sidewall $m$ slanting against the upper flange $d$ of the rim. A portion of the bead $k$ on the lower sidewall $m$ is forcibly inserted between the upper and lower rim flanges $d$, $c$, and is driven inward into the drop-center rim portion $h$. With the present apparatus, the force applying cylinder 58 is rotated to and latched in the position shown in solid lines in FIG. 1. Its upward-slanting piston rod 59 directs the shoe 60 against the tread $n$ adjacent to the sidewall $m$. In so doing it presses the bead $k$ into the rim drop-center $h$, and against its upper sloping side $g$. The radially inward component of the force applied by the cylinder 58 is resisted by latching the rim to the platform 15 so that the smaller-diameter drop-center portion $h$ bears against the inserted portion of the bead $k$. The result is to compressively deflect that portion of the sidewall $m$ between the tread $n$ and the bead $k$ by buckling it locally. Adjacent to its portion so buckled against the drop-center rim portion $h$, the sidewall $m$ shifts to the other side of center of the rim, drawing the bead $k$ tight against the convex surface of the smaller-diameter drop-center portion.

Then progressively the lower bead $k$ is deflected over the upper flange $d$ of the rim, commencing at both sides of the bead portion which was inserted between the rim flanges and proceeding simultaneously in opposite directions. Schematically illustrated in FIG. 3a is the action of the outer and inner telescoping arms 47, 48 and the bead deflector guide shoe 49, whose toe portion, curving inwardly, is shown wiping against and deflecting the out-of-round bead $k$ downward as it sweeps around the perimeter of the upper rim flange $d$, proceeding to a position 180° from the point of force application, FIG. 3b. At this position, the two telescoping arm assemblies 45 are again side-by-side, each of the guide shoes 49 having progressed through 180° as shown by the dashed semi-circular arcs of the plan view FIG. 2. When the bead $k$ of the lower sidewall $m$ has been deflected entirely over the upper rim flange $d$, the tire itself falls to a substantially horizontal position as shown in FIG. 3b; and the force applying shoe 60 may be retracted to the left and down, as in FIG. 3c.

When the local force is first applied as shown in FIG. 3a, the upper sidewall $l$ shifts to the right of center of the rim along with the shifting of the lower sidewall $m$. The bead portion $k$ of the upper sidewall $l$ is thus brought to the right side of the shoe 49; and when the tire falls to substantially horizontal position as shown in FIG. 3b, the upper sidewall bead $j$ comes adjacent to the outer surface of the shoe 49.

With the tire in this position, and the shoe 60 retracted, the telescoping arms 48, 49 are set in motion in reversed direction by the return movement of the rack 33 and its hydraulic actuator 35. The shoes 49 thus guidingly shift the bead $j$ of the upper sidewall $l$ to the left, moving it from the position shown in FIG. 3b to that shown in FIG. 3c; where the bead portion, at the side from which the first locally applied force was exerted, is held toward that side, beyond the upper flange $d$ of the rim. Meanwhile, with the release of the locally applied upward and inward force, the tire, and particularly its lower sidewall $m$, tends to center itself and its bead $k$ moves toward the lower flange $c$ of the rim.

The next step is to force a portion of the upper bead $j$ of the upper sidewall $l$ between the two flanges of the rim $a$. The latching pin 68 is pulled and the pressure cylinder assembly swivel-mounted on the pin 56 is reversed, so that the pressure applying cylinder 58 assumes the upper position shown in dashed lines in FIG. 1. In this position, the force of its piston rod 59 is applied by the shoe 60 angularly downward toward the middle plane of the rim. It acts at a point on the tread $n$ directly above the point of application of the first local force. As with the first application of force, it is directed against the part of the tread adjacent to the sidewall which is then to be shifted to the other side of the rim. However, whereas the first local force (illustrated in FIG. 3a) was directed upward from below, almost in the plane in which the tire was then sloping, this second local force application is exerted partly downward, from the opposite side of the middle plane of the rim.

The effect of applying the local force downward and inward, as shown in FIG. 3d, is first to drive the portion of the upper bead $j$ shown at the left side of FIG. 3c, slidingly off over the curving toe portion 50 of the shoe 49 past the bead-seating portion $f$ of the rim adjacent to its upper flange $d$, and forcibly against sloping side $g$ of the drop-center rim portion $h$. This local force is there resisted in bearing of the convex surface of the drop-center rim portion $h$. The distributed resistance of the bead $j$ against such shifting of the sidewall $l$ acts in tension on the bead $j$, to draw and hold it against the smaller-diameter drop-center portion *h* and thus out-of-round, with the major portion shifted to the other side of center of the rim. When so held, the two telescoping arms 47 are again set in motion, in opposite directions, moving from the left position shown in FIG. 3c and progressing through the typical intermediate position FIG. 3d to the final position FIG. 3e. Thus commencing at the portion of the inserted upper bead *k* adjacent to the inserted portion and progressing simultaneously in opposite directions, they deflect the tire bead *j* entirely over the upper rim flange *d*. The bead deflector guide arms 45 are then removed by removing the machine bolts 27 and sliding the guide arms 45 upward on the keys 43. Thereafter, on releasing the force locally applied by the cylinder 58, the upper sidewall bead *j* will move elastically into position on the sloping bead-seating portion *f* adjacent to the upper rim flange *d*.

METHOD OF DE-MOUNTING

Figure 4:
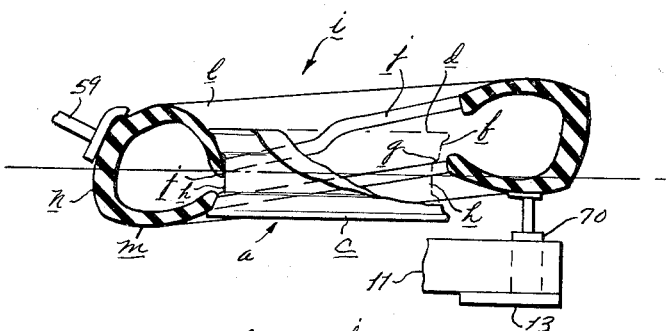
FIGS. 4a, b and c illustrate successive steps of the process of de-mounting a tire.
Figure 4:
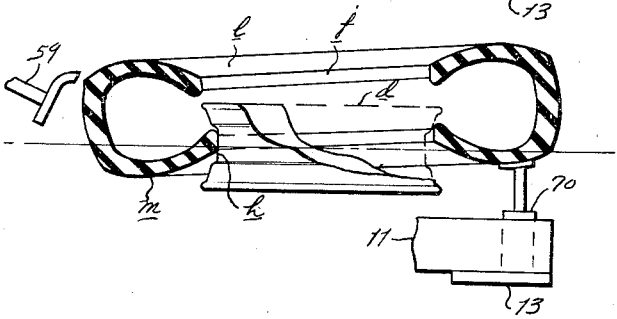
Figure 4:
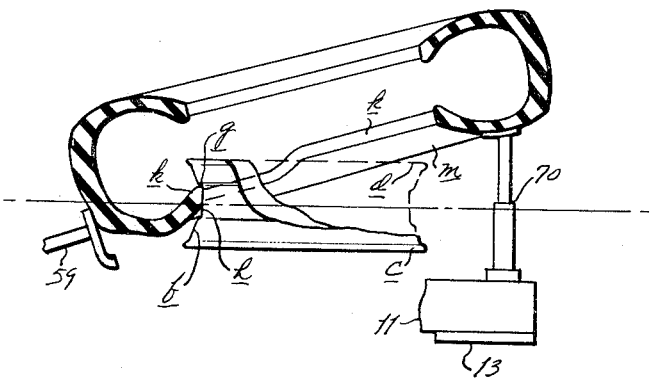

The method of removing a tire is illustrated in FIGS. 4a, b and c. With the bead deflector guide arms 45 removed, the rim *a* is latched in place on the platform 15 in the same manner as previously described. The upper rim flange *d* is left free. Using the pressure applying cylinder 58 in its upper, downward-sloping position shown in dashed lines in FIG. 1, a local force is applied to the tire tread *n*, having a radial component as well as a component directed toward the middle plane of the rim. The point of load application is at the sidewall adjacent to the rim's free upper flange *d*. When the upper bead *j* has been forced off the bead-seating portion *f* and down the sloping side *g* of the drop-center into the drop-center portion *h*, the sidewall *l* will have shifted so that its major part is at the other side of center of the rim, and the upper bead *j* is thus drawn and held out-of-round, with the extreme right side of its bead *j* clear of the rim flange *d*.

The hydraulic telescoping jack 70 is then actuated to exert a jacking force perpendicular to the middle plane *b* of the rim, the force being directed toward the free upper flange *d*. This is continued until the tire is lifted substantialy upward, as shown in FIG. 4a, and the major part of the then out-of-round bead *j* (not including the portion pressed into the rim's drop-center *h*) has been driven by the jacking force and deflected progressively over the rim's free flange *d*, as shown in FIG. 4a. Thereafter the locally applied force which deflected the sidewall at the left side of the FIG. 4a is released, as in FIG. 4b; and the remainder of the bead *j*, being no longer forcibly pressed against the drop-center *h*, removes itself elastically over the free upper flange *d* of the rim. This permits the tire to re-center itself on the rim upward, with its lower sidewall *m* approximately at the level of the drop-center region *h*, as shown in FIG. 4b.

The position of the pressure applying cylinder is then reversed, to that shown in dashed lines of FIG. 1, so that it may apply a force against the tread *n* of the tire at the lower sidewall *m*, not only radially inward but also slantingly upward toward the middle plane *b* of the rim. This deflects the lower sidewall *m* and drives its bead *k* upward and against the convex drop-center portion *h* of the rim until that smaller-diameter surface portion draws the bead *k* in tension out-of-round. The portion of the bead *k* opposite to this force—that is, on the side of the jack 70—will, by the shifting of the sidewall *m*, be held somewhat sideward of the rim's upper flange *d*. On progressive extension of the jack 70, continued application of its force to raise the tire, will draw a major portion of the bead *k* (not including its portion pressed into the drop-center portion *h*) over the upper free flange of the rim as shown in FIG. 4c. Then, the local force applied at the left side of FIG. 4c is released, the remainder of the lower bead *k* will remove itself elastically from the rim. This completes the de-mounting of the tire.

Variations may be made in the above detailed apparatus and in the detailed procedures of mounting and de-mounting, yet following out the essential teachings hereof. Accordingly, this invention should not be construed narrowly, but rather full weight should be accorded to each of the claims hereof.

I claim:

1. A method for mounting and removing a pneumatic tire from a dual-flanged rim, of the type having a smaller-diameter surface drop-center portion, without applying locally excessive prying forces to the beads of the tire sidewalls, consisting of the steps of applying against a localized area of the tread of the tire, at and adjacent to one only of the sidewalls, a local force having a radial component, whereby to press a portion of the bead of that sidewall into the smaller-diameter drop-center portion of the rim, resisting said radial component of applied force by causing the surface of said drop-center portion to bear against said bead, continuing said local force application at and adjacent to said sidewall and the resistance at its bead to deflect and compressively buckle the said sidewall portion therebetween and thereby to shift the major part of said sidewall to the other side of center of the rim, whereby shifting of the tire sidewall exerts tension of its bead against the distributed resistance offered by said smaller-diameter surface portion of the rim and thus draws and holds it out of round, then deflecting over the flange of the rim the portion of said bead, so drawn and held, other than that portion so pressed into the drop-center portion of the rim, then releasing the locally applied force, whereby said bead portion springs elastically from the drop-center portion of the rim, and then repeating said series of steps as to the other sidewall.

2. A method for mounting a pneumatic tire from a dual-flanged rim, of the type having a smaller-diameter convex surface drop-center portion, without applying locally excessive prying forces to the tire beads, consisting initially positioning the tire slantingly against one flange of the rim and inserting a portion of the adjacent tire bead over said flange and between the two flanges, then applying against the tread of the tire, radially outward of the inserted bead portion, a local force having a radial component, whereby to press that bead portion into the smaller-diameter drop-center portion of the rim, and resisting said radial component of applied force by causing the convex surface of the drop-center portion to bear against said bead, continuing said force application and resistance to compressively deflect the sidewall portion therebetween and shift the major part of said sidewall to the other side of center of said rim, whereby to exert tension on the bead against the distributed resistance offered by said smaller-diameter convex surface and thus to draw and hold said bead out of round in said shifted position, then, commencing with a portion of the bead adjacent to that so pressed and continuing around the bead to portions remote from said pressed portion, deflecting the bead, so drawn and held, progressively over said flange of the rim, then releasing the locally applied force, whereby to permit the said bead to center itself and move toward the other flange of the rim, then inserting a portion of said second bead over the first flange, then applying, against the tread of the tire radially outward of said inserted bead portion, a local force having a radial component, whereby to press that bead portion into the smaller-diameter drop-center portion of the rim, and resisting said radial component of applied force by causing the convex surface of the drop-center rim portion to bear against said second bead, continuing said force application and resistance to compressively deflect the sidewall portion therebetween and shift the major part of said sidewall to the other side of center of the rim, whereby to exert tension on the bead against such distributed resistance and thus to draw and hold said bead out of round in said shifted position, then commencing with a portion of said second bead adjacent to that so pressed and continuing around the bead to portions remote from said pressed portion, deflecting said second bead progressively over the said first flange of the rim, and then releasing the locally applied force, whereby to permit the tire to center itself in mounted position on the rim.

3. A method for mounting a pneumatic tire as defined in claim 2, wherein the first and second local forces applied to the tread radially outward of said inserted bead portions are directed in each instance against part of the tread adjacent to that sidewall which is to be so shifted to the other side of center of the rim.

4. A method for mounting a pneumatic tire as defined in claim 2, wherein the local force first applied, following the insertion of the first bead portion, is exerted approximately in the plane of the tire in such initial slanting position, and includes a component exerted toward the middle plane of the rim, and the local force applied following the insertion of the second bead portion includes a component exerted toward the middle plane of the rim from the side opposite to that of the component of said first applied local force.

5. The method defined in claim 2, wherein the separate steps of deflecting the first and second beads progressively over the said first flange are each commenced at both sides of the bead portion inserted between the rim flanges, and proceed simultaneously in opposite directions around to the opposite side of the rim.

6. The method for mounting a pneumatic tire as defined in claim 2, wherein the first and second locally applied forces are applied at the same location along the rim perimeter, together with the intermediate step, after releasing the first locally applied force, of guidingly shifting the second bead to a position in which the portion thereof at said location along the rim perimeter, is sideward beyond the first flange of the rim, whereby to facilitate its subsequent insertion over said flange.

7. The method defined in claim 6, wherein the intermediate step there defined of guidingly shifting the second bead is commenced at the side of rim center opposite to that from which said local forces are applied, and proceeds therefrom simultaneously in opposite directions around the rim to the said side at which said local forces are applied.

8. A method for removing a pneumatic tire from a dual-flanged rim, of the type having a smaller-diameter convex surface drop-center portion, without applying locally excessive prying forces to the tire beads, comprising the steps of securing the rim to a support and leaving one of its flanges free, then applying against the tread of the tire at its sidewall adjacent to the free flange of the rim, a local force having a radial component, whereby to press that bead portion into the smaller-diameter drop-center of the rim, and resisting said radial component by causing the convex smaller-diameter drop-center rim portion to bear against said bead, continuing said force application and resistance to compressively deflect the sidewall portion therebetween and shift the major portion of said sidewall to the other side of center of said rim, whereby to exert tension on the bead against the distributed resistance offered by said smaller-diameter convex surface and thus to draw and hold the bead out of round in said shifted position, then applying against the tire at the side of center to which said sidewall has shifted, a jacking force perpendicular to the middle plane of the rim and directed toward its free flange, and continuing the jacking force application until the major portion of the bead of said sidewall, so drawn and held out of round, excluding the portion pressed into the drop-center at the other side of the rim, has been driven by said jacking force and deflected over said free flange, then releasing said locally applied force, whereby to permit the remainder of the bead of said sidewall to remove itself elastically from its position against the drop-center and over the free flange and to permit the other sidewall of the tire to re-center itself on said rim, then applying against the tread of the tire, at its second sidewall, a local force having a similar radial component and similarly resisting said component by causing said smaller-diameter drop-center portion to bear against said bead, continuing said force application and resistance to compressively deflect the sidewall portion therebetween and shift the major portion of said sidewall to the other side of center of the rim, whereby to exert tension on the bead against the distributed resistance offered by said smaller-diameter convex surface and thus to draw and hold the bead out of round in said shifted position, then applying against the tire at the side of center to which said sidewall has so shifted a further perpendicular jacking force and continuing its application until the major portion of the bead of said second sidewall so drawn and held out of round, excluding the portion pressed into the drop-center at the other side of the rim, has been driven by said jacking force and deflected over said free flange, and then releasing said locally applied force, whereby the remainder of said second sidewall elastically removes itself over the free flange of the rim.

9. A method for removing a pneumatic tire as defined in claim 8, wherein the said first applied local force includes a component directed toward the middle plane of the rim from the side thereof at which the rim's free flange is positioned, and the local force secondly applied includes a component directed toward such middle plane of the rim from the opposite side thereof.

10. Apparatus for use in mounting and removing heavy pneumatic tires from dual-flanged wheel rims, comprising means to secure such a rim in a stationary position with its middle plane horizontal and with its upper flange free, means positioned outward from said securing means selectively to apply a local force radially inward and partially upward toward such middle plane of said rim and to apply to a local force radially inward and partially downward toward such middle plane of said rim, vertical axis shaft means substantially at the center of such stationary position of the rim, arm means securable to the vertical axis shaft means for rotation, bead deflector guide means carried by the arm means and having a bead deflector surface extending from above to below the level of the upper flange of such rim, and means to rotate the arm means about the vertical axis shaft means at a level above such upper flange of the rim, whereby to move the bead deflector guide means in an arcuate path about such upper rim flange.

11. Apparatus as defined in claim 10, wherein the vertical shaft axis means comprises a pair of adjacent shafts supported vertically for rotation, the arm means comprises a pair of telescoping arms, one on each of said shafts, the bead deflector guide means is at the outer end of each of said telescoping arms and has a radially inward presented flange-riding surface, and the means to rotate comprises gears on portions of said shafts below the stationary position in which the rim is secured and means to drive said gears simultaneously in opposite directions each through a substantially semi-circular arc, whereby the bead deflector guide means ride such rim flange simultaneously in opposite directions, each over substantially half its perimeter.

12. Apparatus as defined in claim 10, said selective local force-applying means having a mount including a horizontal swivel substantially at the level of said middle plane of the rim, and means to secure said mount in two positions about its swivel, in one of which positions the said force-applying means is below the middle plane of such rim and directed slantingly upward toward it, and in the other of which means said force-applying positions is above said plane and being directed slantingly downward toward it.

13. Apparatus as defined in claim 10, together with a power-operated jack having a jacking axis perpendicular to such middle plane of the rim outwardly of its stationary position and on the side thereof opposite to the said local force-applying means, the jack having a lowered position below the stationary position of the rim and being raisable therefrom to an upper position above the middle plane of the rim.

References Cited

UNITED STATES PATENTS 2,497,644    2/1950    Watkins _____ 157—1.24
2,795,268    6/1957    Branick _____ 157—1.1 X TRAVIS S. McGEHEE, Primary Examiner U.S. Cl. X.R.

157—1.24